(12) United States Patent
Kamatani

(10) Patent No.: US 6,873,940 B1
(45) Date of Patent: Mar. 29, 2005

(54) MEASURING METHOD AND MEASURING SERVICE SYSTEM USING COMMUNICATION MEANS

(75) Inventor: Yasuo Kamatani, Kanagawa-Ken (JP)

(73) Assignee: LaserDynamics, Inc. (JP)

( * ) Notice: Subject to any disclaimer, the term of this patent is extended or adjusted under 35 U.S.C. 154(b) by 0 days.

(21) Appl. No.: 09/979,623

(22) PCT Filed: Mar. 7, 2000

(86) PCT No.: PCT/JP00/01371
§ 371 (c)(1),
(2), (4) Date: Feb. 22, 2002

(87) PCT Pub. No.: WO01/67420
PCT Pub. Date: Sep. 13, 2001

(51) Int. Cl.⁷ .............................................. G06F 15/00
(52) U.S. Cl. ...................................... 702/189; 709/217
(58) Field of Search ........................ 702/57, 62, 64–68, 702/71, 80, 104, 118–123, 126, 182, 183, 185, 188, 189; 701/1, 2, 33–36; 345/771; 709/217–219

(56) References Cited

U.S. PATENT DOCUMENTS

| | | | |
|---|---|---|---|
| 5,729,452 A | * | 3/1998 | Smith et al. .................... 701/29 |
| 5,884,202 A | | 3/1999 | Arjomand ...................... 701/29 |
| 6,181,994 B1 | * | 1/2001 | Colson et al. ................. 701/33 |
| 6,295,492 B1 | * | 9/2001 | Lang et al. .................... 701/33 |
| 6,330,499 B1 | * | 12/2001 | Chou et al. .................... 701/33 |
| 6,405,111 B2 | * | 6/2002 | Rogers et al. ................. 701/33 |
| 6,434,455 B1 | * | 8/2002 | Snow et al. ................... 701/33 |
| 6,505,100 B1 | * | 1/2003 | Stuempfle et al. ............. 701/1 |
| 6,522,345 B1 | * | 2/2003 | Alexander .................. 345/771 |
| 6,560,557 B1 | * | 5/2003 | Carnahan et al. ........... 702/122 |
| 6,691,050 B2 | * | 2/2004 | Stark ........................... 702/66 |

FOREIGN PATENT DOCUMENTS

| | | |
|---|---|---|
| EP | 0807873 A1 | 11/1997 |
| JP | 56-40998 | 4/1981 |
| JP | 10-124790 | 5/1998 |

OTHER PUBLICATIONS

Alan V. Oppenheim, Signals & Systems, 1983, Prentice-Hall, Inc., second edition, pp. 582–583.*
International Search Report, PCT/JP00/01371, mailed Jun. 13, 2000, 2 pgs.

* cited by examiner

*Primary Examiner*—Marc S. Hoff
(74) *Attorney, Agent, or Firm*—Hamilton & Terrile, LLP; Michael Rocco Cannatti (57) ABSTRACT

According to the present invention, detection signals detected from a measured medium (medium to be measured) are modulated by interface means into specific detection signs, and transmitted to a communication line by means of a transmitter on the client side. The detection signals transmitted are received at a receiver on the server side, demodulated by interface means through measurement-signal receiving means, and analyzed by desired one of measuring instruments. The detection signals of the measurement results from the measuring instrument are modulated through an interface circuit and measurement-result sending circuit, and transmitted to the communication line by means of the transmitter on the server side. The data signals of the measurement results are received at the receiver on the client side, and demodulated by the measurement-result receiving means, so that the measurement results can be obtained on measurement-results display means.

41 Claims, 4 Drawing Sheets

MEASURING METHOD AND MEASURING SERVICE SYSTEM USING COMMUNICATION MEANS

TECHNICAL FIELD

The present invention relates to a measurement service system and method, and particularly to a novel measurement service system for carrying out remote measurements or telemetry using communication means, and a measurement method using the same.

BACKGROUND ART

Various measuring instruments have conventionally been put to practical use with features widely varying from instrument to instrument.

Some known types of measuring instruments are: electric/electronic measuring instruments, such as an oscilloscope and a spectrum analyzer, necessary for various research and development activities in electric engineering and electronics; medical diagnostic equipment used at medical institutions; chemical analyzers for analyzing the components of a material; and testers for diagnosing problems such as vehicle trouble.

These conventional measuring instruments, however, remain available on a stand-alone basis, on which a measuring instrument is used for one measurement work to carry out measurements of a measured medium on the premises.

Under present circumstances, there is no method for operating a measuring instrument on a network to concurrently process measurement data from two or more measured media so that two or more users can share the one measuring instrument.

DISCLOSURE OF THE INVENTION

The present invention has been made in consideration of the above-mentioned present circumstances, and it is an object thereof to provide a novel measurement service system and method for connecting a client apparatus and a server apparatus through an interactive communication line. In the system and method, the client apparatus fetches measurement data on a measured medium and the server apparatus executes measurement processing to obtain measurement processing results.

In one aspect of the present invention, there is provided a measurement service system, which is furnished with a server apparatus and a client apparatus connected to each other through an interactive communication line. The client apparatus sends measurement data, input thereto from a measured medium, to the server apparatus through the interactive communication line. On the other hand, the server apparatus executes measurement processing on the basis of the measurement data to send data on the measurement processing results to the client apparatus through the interactive communication line. In this method, the client apparatus includes client-side modulation means for modulating the measurement data into signals suitable for transmission, and client-side demodulation means for demodulating the data on the measurement processing results into signals suitable for processing on the client apparatus. On the other hand, the server apparatus includes at least one measurement means capable of executing measurement processing on the basis of the measurement data, and server-side modulation means for modulating the data on the measurement processing results into signals suitable for transmission.

In another aspect of the present invention, there is provided a measurement method for connecting a server apparatus and a client apparatus through an interactive communication line, such that the client apparatus sends measurement data, input thereto from a measured medium, to the server apparatus through the interactive communication line, while the server apparatus executes measurement processing on the basis of the measurement data to send data on the measurement processing results to the client apparatus through the interactive communication line. In this method, the client apparatus modulates the measurement data into signals suitable for transmission, and demodulates the data on the measurement processing results into signals suitable for processing on the client apparatus. On the other hand, the server apparatus executes measurement processing on the basis of the measurement data, and modulates the data on the measurement processing results into signals suitable for transmission.

In still another aspect of the present invention, there is provided a measurement service method, which connects a server computer and a client computer through a Web site on the Internet, such that the client computer sends measurement data, input thereto from a measured medium, to the server computer through the Internet network, while the server computer executes measurement processing using at least one of measurement instruments connected to the server computer on the basis of the measurement data to send data on the measurement processing results to the client computer through the Internet network. In this method, applications for measurement services are accepted on the Web site.

BEST MODES FOR CARRYING OUT THE INVENTION

Hereinbelow, detailed description will be made about embodiments of the present invention with reference to the accompanying drawings.

Figure 1:
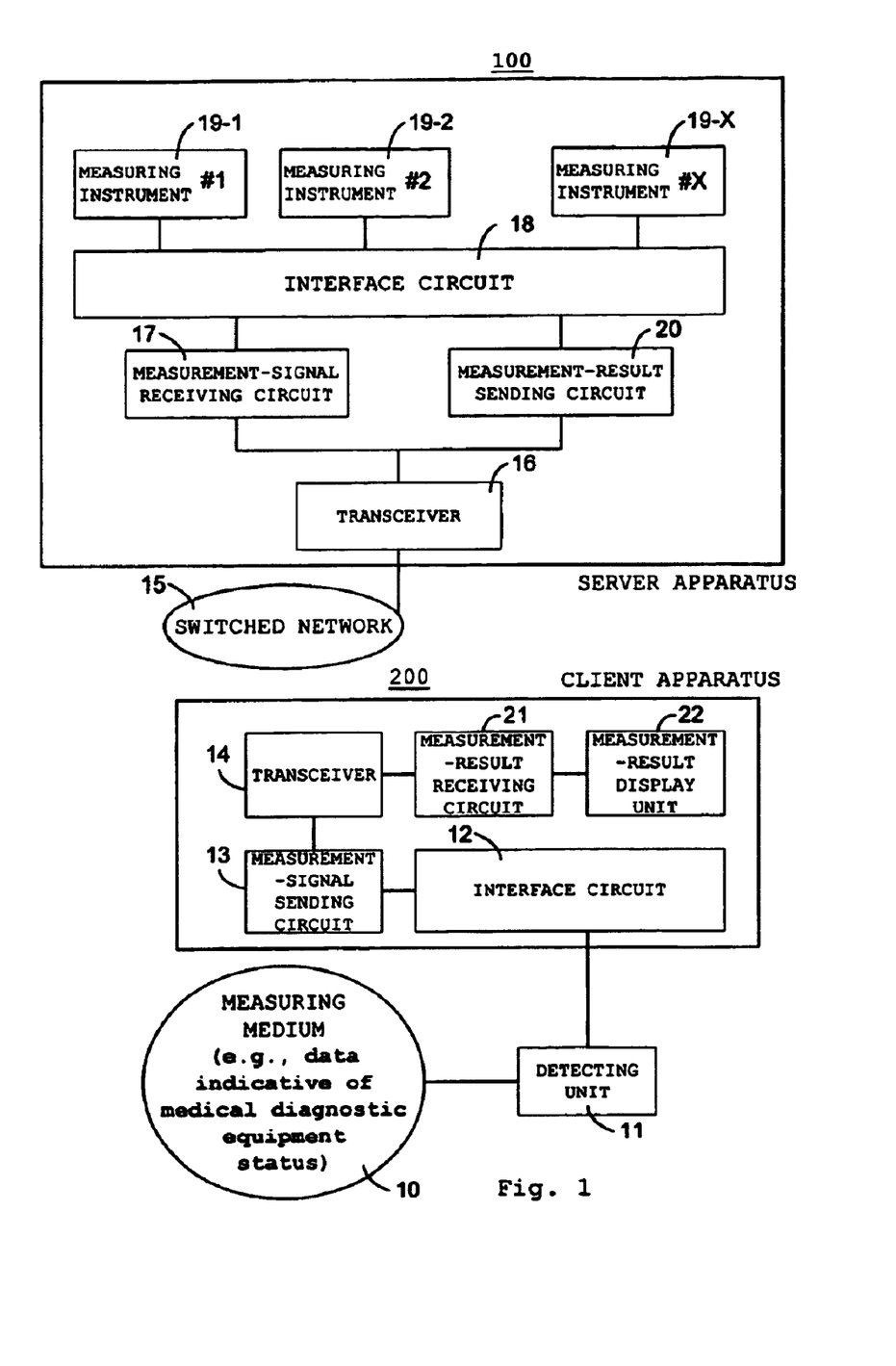
FIG. 1 is a diagram illustrating a schematic configuration of a measurement service system for explaining the principle of the measurement system according to the present invention.

FIG. 1 is a diagram for explaining the principle of the present invention.

A measurement service system according to the present invention is constituted of a client apparatus 200 for capturing or taking in measurement data from a measured medium 10, and a server apparatus 100 for executing measurement processing on the basis of the measurement data to obtain data on the measurement processing results. The client apparatus 200 and the server apparatus 100 are connected to each other through an interactive communication line.

The measurement data are transmitted from the client apparatus 200 to the server apparatus 100 through the interactive communication line, while the data on the measurement processing results are transmitted from the server apparatus 100 to the client apparatus 200 through the interactive communication line.

The measured medium 10 is connected to the client apparatus 200 through a detecting unit 11.

The client apparatus 200 is connected to the server apparatus through a switched network 15.

The detecting unit 11 detects the measurement data on the measured medium 10.

The client apparatus 200 then takes in the measurement data detected by the detecting unit 11.

The client apparatus 200 is constituted of an interface circuit 12, a measurement-signal sending circuit 13, a receiver/transmitter or transceiver 14, a measurement-result receiving circuit 21, and a measurement-result display unit 22.

The measurement data taken from the detecting unit 11 into the client apparatus 200 are modulated by the interface circuit 12 as detection signals, coded by the measurement-signal sending circuit 13 into signals suitable for transmission, and subjected to other modulation processing such as multiplexing as required.

The transceiver 14 transmits the modulated detection signals to the switched network 15.

The server apparatus 100 receives the measurement data from the switched network 15.

The server apparatus 100 is constituted of a receiver/transmitter or transceiver 16, a measurement-signal receiving circuit 17, an interface circuit 18, measuring instruments 19 and a measurement-result sending circuit 20.

The detection signals (measurement data) received at the transceiver 16 through the switched network 15 are demodulated by the measurement-signal receiving circuit 17 and transferred to the interface circuit 18.

The interface circuit 18 selects desired one of the measuring instruments 19-1, 19-2, . . . , 19-X (where X is an integer larger than one) and transmits the demodulated detection signals to the selected measuring instrument. Thus the detection signals are measured by any one of the measuring instruments 19-1, 19-2, . . . , 19-X.

Upon transmission of the detection signals (measurement data) from the client apparatus 200, the measurement-signal sending circuit 13 may add to the detection signals coded data indicative of which measuring instrument 19 in the server apparatus 100 should be selected.

In such a case, any one of the measuring instruments 19 is selected on the basis of the coded information.

Then the measuring instrument 19 executes measurement processing for the measurement data to obtain data on the measurement processing results.

The data on the measurement processing results are modulated by the interface circuit 18, coded by the measurement-result sending circuit 20 into signals suitable for transmission, and subjected to other modulation processing such as multiplexing as required.

The transceiver 16 transmits the modulated data signals of the measurement results to the switched network 15.

The data signals of the measurement results are received at the transceiver 14 of the client apparatus 200 through the switched network 15, demodulated by the measurement-result receiving circuit 21, and displayed on the measurement-result display unit 22. Thus the measurement results can be made visible.

In measuring the measured medium 10, the client apparatus 200 merely carries out detection of the measurement data and display of the data on the measurement processing results, leaving measurement processing and analysis to the server apparatus 100.

It should be noted that functions of all the circuits in the server apparatus 100 and the client apparatus 200 may be left to a server computer and a client computer, respectively.

The switched network 15 used as the interactive communication line may also be replaced with the Internet, a private line or a wireless communication channel.

Further, the detecting unit 11 that connects the measured medium 10 with the client apparatus 200 is not necessarily provided, and the client apparatus 200 itself may have the function of detecting the measurement data.

Figure 2:
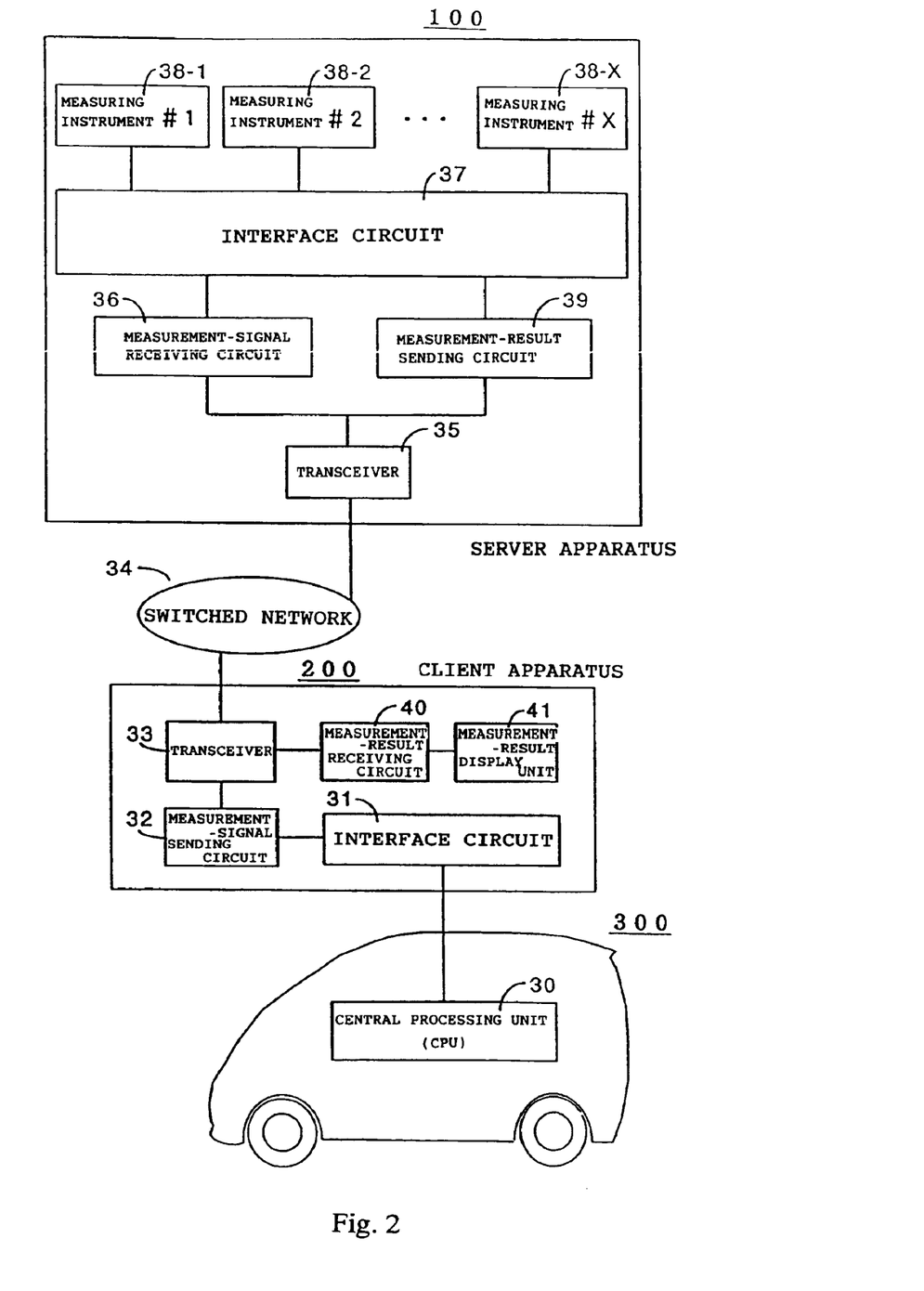
FIG. 2 is a diagram illustrating a schematic configuration of a measurement service system according to a first embodiment of the present invention.

FIG. 2 is a diagram illustrating a schematic configuration of a measurement service system according to the first embodiment of the present invention.

In this embodiment, the present invention is applied to a system for diagnosing an automobile 300.

A central processing unit (CPU) 30 installed in the automobile 300 is connected with all pieces of equipment mounted in the automobile 300 for storing measurement data related to states of all the pieces of automobile-mounted equipment.

Upon diagnosing all the pieces of equipment mounted in the automobile 300, the CPU 30 transmits data related to these pieces of automobile-mounted equipment as detection signals to an interface circuit 31 of the client apparatus 200.

The detection signals are modulated by the interface circuit 31 as detection signals, coded by a measurement-signal sending circuit 32 into signals suitable for transmission through an interactive communication line, and subjected to other modulation processing such as multiplexing as required.

A transceiver 33 transmits the modulated detection signals to a switched network 34.

The detection signals are received at a transceiver 35 of the server apparatus 100 through the switched network 34, demodulated by a measurement-signal receiving circuit 36, and sent to an interface circuit 37.

The interface circuit 37 selects desired one of measuring instruments 38-1 to 38-X (where X is an integer larger than one) and transmits the demodulated detection signals to the selected measuring instrument.

Thus the selected one of the measuring instruments 38-1 to 38-X executes measurement processing for the measurement data obtained from all the pieces of equipment mounted in the automobile 300.

It should be noted that the selection of a measuring instrument 38 might be made according to the type of automobile, the portion to be diagnosed in the automobile, or the type of automobile-mounted equipment.

The data on the measurement processing results are modulated by the interface circuit 37, coded by a measurement-result sending circuit 39 into signals suitable for the communication line, and subjected to other modulation processing such as multiplexing as required.

The transceiver 35 transmits the modulated data signals of the measurement results to the switched network 34.

The data signals of the measurement processing results are received at the transceiver 33 of the client apparatus 200 through the switched network 34, demodulated by a measurement-result receiving circuit 40, and displayed on a measurement-result display unit 41. Thus the measurement results can be made visible.

The measurement processing results may also be informed audibly together with or instead of the display on the measurement-result display unit 41.

In the embodiment, problems such as automobile trouble can be diagnosed by telemetering without the need to place the main body of a measuring instrument in a work area where the automobile 300 is to be diagnosed so that measurement processing will be carried out on the premises.

Further, a wireless communication channel can be used instead of the switched network 34, which makes it possible to diagnose a traveling vehicle.

Figure 3:
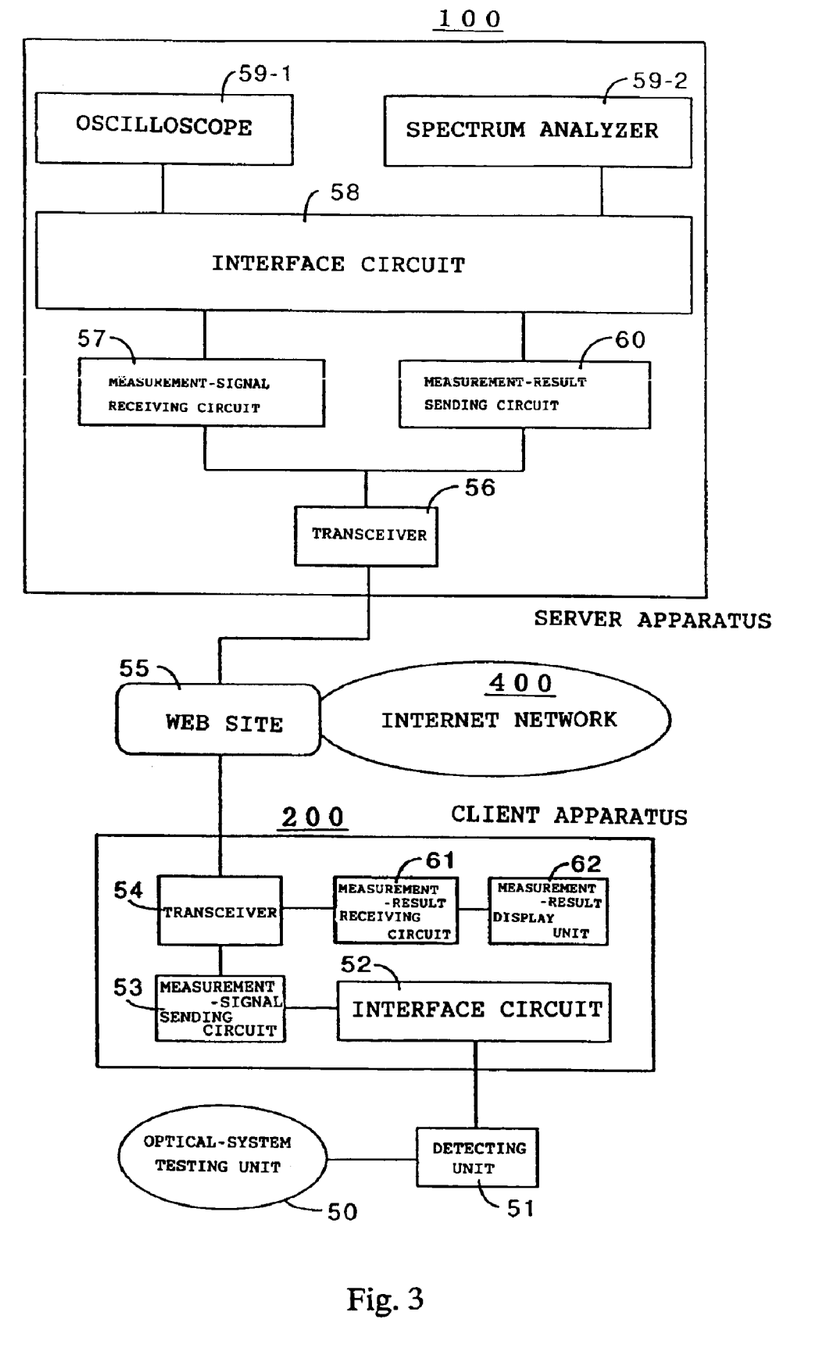
FIG. 3 is a diagram illustrating a schematic configuration of a measurement service system according to a second embodiment of the present invention.

FIG. 3 is a diagram illustrating a schematic configuration of a measurement service system according to the second embodiment of the present invention.

This embodiment illustrates a measurement service system used at an optical testing laboratory that carries out various measurements of optical equipment by remote control to obtain measurement results there.

In the embodiment, an optical-system testing unit 50 obtains desired measurement data and a detecting unit 51 detects the measurement data. Then an interface circuit 52 of the client apparatus 200 captures or takes in the detected measurement data as detection signals.

The detection signals are modulated by the interface circuit 52 as detection signals, coded by a measurement-signal sending circuit 53 into signals suitable for transmission through a communication line, and subjected to other modulation processing such as multiplexing as required.

A transceiver 54 transmits the modulated detection signals to the Internet network 400 via a Web site 55.

In the embodiment, the Internet network is used as the interactive communication line.

Therefore, applications for measurements are accepted on the Web site 55, and in some cases, the applicants may be billed online through the Web site 55.

The server apparatus 100 and the client apparatus 200 may be a server computer and a client computer, respectively. In this case, a desired measuring instrument in the server apparatus 100 can be selected on the Web site 55 so that transmission of measurement data from the client apparatus 200 will be accepted.

The server computer may also have the functions of detecting whether the measurement data are capable of being measured by any measuring instrument in the server apparatus 100, and notifying whether the measurement service is available.

Further, the measurement service system may be such that the operating state of each measuring instrument can be confirmed on the Web site 55.

Furthermore, storage means, not-shown, may be provided in the server computer for storing past measurement data and measurement results for each user so that the past data can be summarized or tallied up according to the user's needs.

The storage means, not shown, may also be provided in the server computer for temporarily storing measurement data when a desired measuring instrument is in operation, so that after measurements are made by the measuring instrument, measurement results will be e-mailed to the client computer.

The detection signals are received at a transceiver 56 of the server apparatus 100 through the Internet network, demodulated by a measurement-signal receiving circuit 57, and transmitted to an interface circuit 58.

The interface circuit 58 selects desired one of measuring instruments and transmits the demodulated detection signals (measurement data) to the selected measuring instrument. In the embodiment, an oscilloscope 591 and a spectrum analyzer 59-1 are installed as measuring instruments.

Upon transmission of the detection signals (measurement data), the measurement-result sending circuit 53 of the client apparatus 200 may send the detection signals with adding thereto a coded data indicative of which measuring instrument should be selected.

The data on the measurement processing results are modulated by the interface circuit 58, coded by a measurement-result sending circuit 60 into signals suitable for transmission, and subjected to other modulation processing such as multiplexing as required.

The transceiver 56 transmits the modulated data signals of the measurement results to the Internet network 400.

The data signals of the measurement results are received at the transceiver 54 of the client apparatus 200 through the Internet network 400, demodulated by a measurement-result receiving circuit 61, and displayed on a measurement-result display unit 62. Thus the measurement results can be made visible.

In the embodiment, the measurement data are transmitted from the optical testing laboratory that carries out various measurements of optical equipment to the server apparatus through the Web site on the Internet, while the data on the measurement processing results are received at the laboratory through the Internet line.

Since the measuring instruments required for measuring optical equipment, such as the oscilloscope and the spectrum analyzer, are relatively expensive, it is better to install the measuring instruments at a remote service station that constitutes the server apparatus, rather than at each independent laboratory. This makes it possible effectively share the expensive measuring instruments between two or more laboratories.

Figure 4:
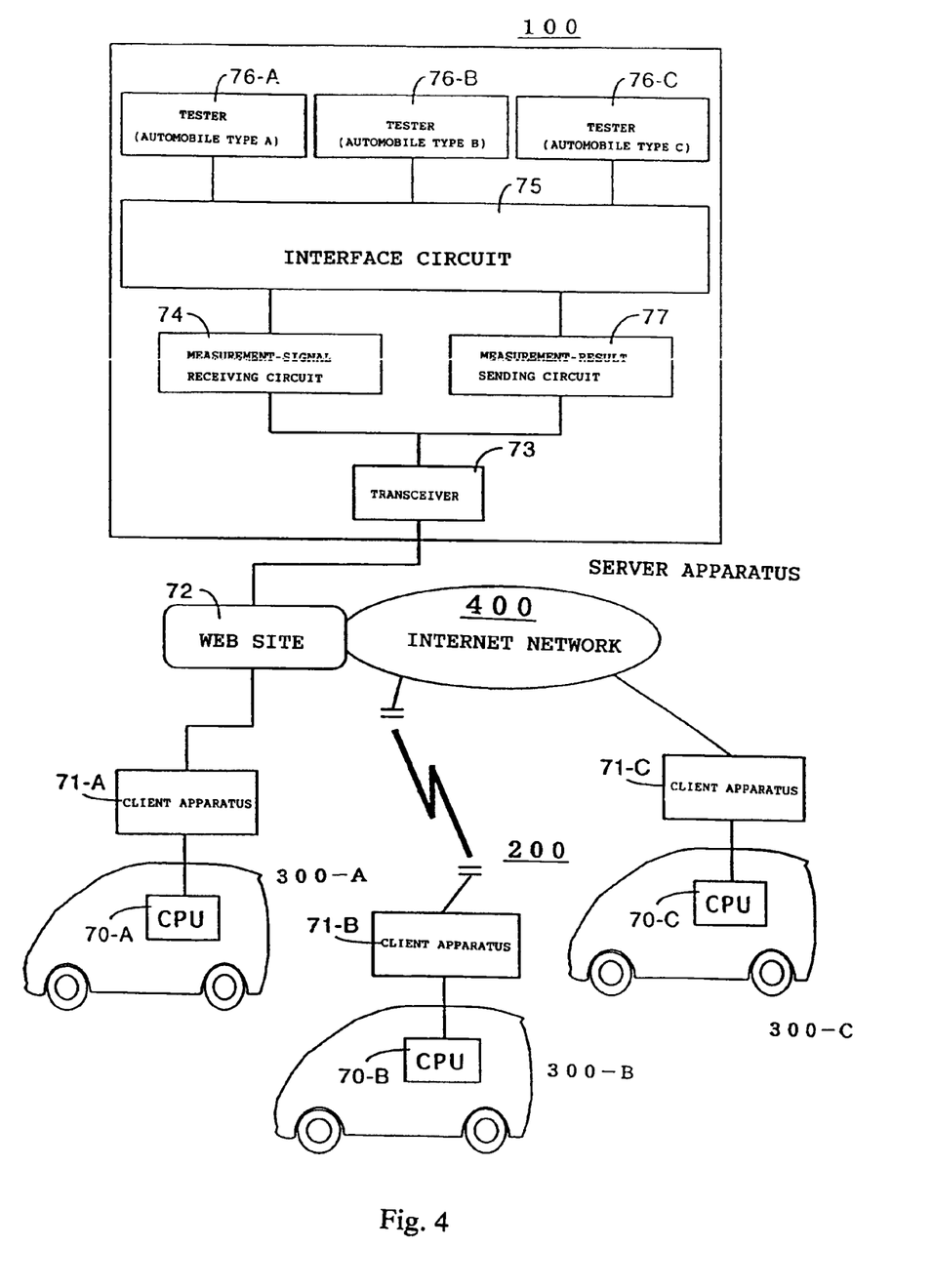
FIG. 4 is a diagram illustrating a schematic configuration of a measurement service system according to a third embodiment of the present invention.

FIG. 4 is a diagram illustrating a configuration of a measuring service system according to the third embodiment of the present invention.

This embodiment illustrates a measurement service system for exercising control over carrying out fault diagnosis and inspection of various types of automobiles 300-A, 300-B and 300-C so that measurement processing results can be obtained by remote control.

A CPU 70 installed in each automobile 300 is connected with all pieces of equipment mounted in the automobile 300 for storing measurement data related to states of all the pieces of automobile-mounted equipment.

When an automobile needs fault diagnosis and inspection, the corresponding CPU 70 detects data related to these pieces of equipment and sends the same as detection signals to a client apparatus 71. Each client apparatus 71 accesses a Web site 72 on the Internet 400 through each two-way wireless communication channel to transmit the detection signals.

The detection signals are received at a transceiver 73 of the server apparatus 100 through the Internet 400, modulated by a measurement-signal receiving circuit 74 and sent to an interface circuit 75.

The interface circuit 75 selects desired one of measuring instruments (testers) and transmits the demodulated detection signals to the selected measuring instrument.

In the embodiment shown in FIG. 4, a measuring instrument (tester) is provided for each type of automobile so that a desired tester will be selected from all the testers 76-A to 76-C according to the type of automobile.

It should be noted that the detection signals could be sent with adding thereto coded data related to the type of automobile. In this case, the interface circuit 75 can select a corresponding tester on the basis of the coded information to send the measurement data to the selected tester.

The data on the measurement processing results are modulated by the interface circuit 75, coded by a measurement-result sending circuit 77 into signals suitable for the communication line, and subjected to other modulation processing such as multiplexing as required.

The transceiver 73 transmits the modulated data signals of the measurement results to the Internet network 400, and displayed on each client apparatus 71 as the diagnostic results.

The above-mentioned embodiments showed processing for measurement data, which includes data indicative of the state of each piece of automobile-mounted equipment, data indicative of the state of each piece of equipment that is part of an automobile, and data obtained by operating physical and chemical equipment. However, the present invention is not to process the above-mentioned measurement data. For example, various types of medical diagnostic data on patients obtained at a medical institution may be used as measurement data and processed at a remote location.

INDUSTRIAL APPLICABILITY

The present invention is to make various measurements by remotely control or telemetering using an interactive communication line. Unlike the conventional system, in which a measuring instrument is used on a stand-alone basis for one measurement work, the present invention offers a method of using a network for concurrently sharing measurement processing among many users. The present invention can thus realize a novel measurement service system and method, which expands its industrial applicability.

What is claimed is:

1. A measuring service system comprising a server apparatus and a client apparatus connected to each other through an interactive communication line, such that the client apparatus sends measurement data, input thereto from a measured medium, to the server apparatus through the interactive communication line, while the server apparatus executes measurement processing on the basis of the measurement data to send data on the measurement processing results to the client apparatus through the interactive communication line, wherein said client apparatus comprises client-side modulation means for modulating the measurement data into signals suitable for transmission, and client-side demodulation means for demodulating the data on the measurement processing results into signals suitable for processing on said client apparatus, and said server apparatus comprises at least one measurement means capable of executing measurement processing on the basis of the measurement data, means for detecting whether the measurement data are capable of being measured by any measurement means in the said server apparatus, and notifying whether the measurement processing is available and server-side modulation means for modulating the data on the measurement processing results into signals suitable for transmission.

2. The system according to claim 1, wherein the measurement data from said measured medium are data obtained by operating physical and chemical equipment.

3. The system according to claim 2, wherein the physical and chemical equipment is experimental equipment for testing an optical apparatus.

4. The system according to claim 3, wherein the measurement means provided in said server apparatus are oscilloscopes and/or spectrum analyzers.

5. The system according to claim 1, wherein the measurement data from said measured medium are data indicative of the state of a piece of equipment that is part of an automobile.

6. The system according to claim 5, wherein the measurement means provided in said server apparatus are testers each of which corresponds to each type of vehicle.

7. The system according to claim 1, wherein said client apparatus further comprises means for adding to the measurement data coded information for specifying measurement means for executing measurement processing in said server apparatus.

8. The system according to claim 7, wherein a plurality of measurement means are provided, such that any one of said measurement means is selected on the basis of the coded information added to the measurement data.

9. The system according to claim 1, wherein said interactive communication line comprises the Internet network, a switched line or a private line.

10. The system according to claim 1, wherein said interactive communication line comprises a wireless communication channel.

11. The system according to claim 1, further comprising detecting unit for fetching the measurement data from the measured medium to input the same to said client apparatus.

12. The system according to claim 1, wherein the measurement data from said measured medium are data indicative of the state of a piece of equipment mounted in an automobile.

13. The system according to claim 1, wherein the measurement data from said measured medium are medical diagnostic data.

14. The system according to claim 1, wherein a plurality of measurement means are provided so that any one of the measurement means will be selected according to the measurement data.

15. The system according to claim 1, wherein said client apparatus further comprises display means connected to said client-side demodulation means, such that the data on the measurement processing result are displayed on said display means.

16. The system according to claim 1, wherein said client apparatus further comprises audio output means connected to said client-side demodulation means, such that the audio output means will audibly output the data on the measurement processing results.

17. A measurement method for connecting a server apparatus and a client apparatus through an interactive communication line, such that the client apparatus sends measurement data, input thereto from a measured medium, to the server apparatus through the interactive communication line, while the server apparatus executes measurement processing on the basis of the measurement data to send data on the measurement processing results to the client apparatus through the interactive communication line, wherein said client apparatus modulates the measurement data into signals suitable for transmission, and demodulates the data on the measurement processing results into signals suitable for processing on said client apparatus, and said server apparatus detects whether the measurement data is capable of being processed at the server apparatus, notifies whether a measurement data processing service is available, executes measurement processing on the basis of the measurement data, and modulates the data on the measurement processing results into signals suitable for transmission.

18. The method according to claim 17, wherein the measurement data from said measured medium are data obtained by operating physical and chemical equipment.

19. The method according to claim 18, wherein the physical and chemical equipment is experimental equipment for testing an optical apparatus.

20. The method according to claim 19, wherein the data on the measurement processing results are obtained using an oscilloscope and/or spectrum analyzer.

21. The method according to claim 17, wherein the measurement data from said measured medium are data indicative of the state of a piece of equipment that is part of an automobile.

22. The method according to claim 21, wherein the data on the measurement processing results are obtained using a tester corresponding to each type of automobile.

23. The method according to claim 17, wherein said client apparatus further comprises means for adding to the measurement data coded information for specifying measurement means for executing measurement processing in said server apparatus.

24. The method according to claim 23, wherein a plurality of measurement means are provided,
such that any one of the measurement means will be selected on the basis of coded information added to the measurement data.

25. The method according to claim 17, wherein the interactive communication line comprises the Internet network, a switched line or a private line.

26. The method according to claim 17, wherein the interactive communication line comprises a wireless communication channel.

27. The method according to claim 17, wherein the measurement data from said measured medium are data indicative of the state of a piece of equipment mounted in an automobile.

28. The method according to claim 17, wherein the measurement data from said measured medium are medical diagnostic data.

29. The method according to claim 17, wherein a plurality of measurement means are provided so that any one of the measurement means will be selected according to the measurement data.

30. The method according to claim 17, wherein said client apparatus displays the data on the measurement processing results.

31. The method according to claim 17, wherein said client apparatus audibly outputs the data on the measurement processing results.

32. A measurement service method for connecting a server computer and a client computer through a Web site on the Internet, such that the client computer sends measurement data, input thereto from a measured medium, to the server computer through the Internet network, while the server computer executes measurement processing on at least one of measurement instruments connected to the server computer on the basis of the measurement data to send data on the measurement processing results to the client computer through the Internet network, wherein applications for measurement services are accepted on the Web site and wherein said server computer has the functions of detecting whether the measurement data are capable of being measured by any measuring instrument in the said server computer, and notifying whether the measurement service is available.

33. The method according to claim 18, wherein the measurement services are billed online through the Web site.

34. The method according to claim 18, wherein a desired one of the measuring instruments is selected on the Web site before transmission of the measurement data is accepted.

35. The method according to claim 18, wherein an operating state of each of the measuring instruments is confirmed on the Web site.

36. The method according to claim 18, wherein said server computer further comprises storage means for storing past measurement data and measurement results for each user so that the past data can be summarized or tallied up according to the user's needs.

37. The method according to claim 18, wherein said server computer further comprises storage means for temporarily storing measurement data when a desired measuring instrument is in operation, so that after measurements are made by the measuring instrument, measurement results will be e-mailed to the said client computer.

38. A client apparatus in a measurement service system, which is connected to a server apparatus through an interactive communication line, said server apparatus comprising a measuring instrument and a detector for indicating if received data is capable of being measured by said measuring instrument, wherein said client apparatus sends measurement data, input thereto from a measured medium, to the server apparatus through the interactive communication line, and receives data from the server apparatus through the interactive communication line as a result of measurement processing executed on the server apparatus on the basis of the measurement data, said client apparatus comprising:

modulation means for modulating the measurement data into signals suitable for transmission; and demodulation means for demodulating the data on the measurement processing results into signals suitable for processing on said client apparatus.

39. A server apparatus in a measurement service system, which is connected to a client apparatus through an interactive communication line, such that it receives measurement data, input from a measured medium to the client apparatus, through the interactive communication line, executes measurement processing on the basis of the measurement data, and transmits data on the measurement processing results to the client apparatus through the communication line, said server apparatus comprising:

at least one measurement means that enables execution of measurement processing on the basis of the measurement data;

a means for detecting whether the measurement data is capable of being measured by any measurement means in the server apparatus and notifying whether the measurement processing for the measurement data is available; and modulation means for modulating the data on the measurement processing results into signals suitable for transmission.

40. A measurement method, which is furnished with a client apparatus connected to a server apparatus through an interactive communication line, such that the client apparatus sends measurement data, input thereto from a measured medium, to the server apparatus through the interactive communication line, and receives data from the server apparatus through the interactive communication line as a result of measurement processing executed on the server apparatus on the basis of the measurement data, wherein the server apparatus detects whether the measurement data is capable of being measured by any measuring instrument in the said server apparatus and notifies the client apparatus whether a measurement processing service is available for the measurement data, the measurement data are modulated into signals suitable for transmission, and the data on the measurement processing results are demodulated into signals suitable for processing on said client apparatus.

41. A measurement method for connecting a client apparatus through an interactive communication line, comprising receiving measurement data from the client apparatus input thereto from a measured medium through the interactive communication line, detecting if the measurement data can be processed, notifying the client apparatus if the measurement data cannot be processed, otherwise executing measurement processing on the basis of the measurement data, and sending data on the measurement processing results to the client apparatus through the interactive communication line, wherein measurement processing is performed on the basis of the measurement data, and the data on the measurement processing results are modulated into signals suitable for transmission.

* * * * *